Aug. 13, 1968 J. C. RIEDEL 3,397,329
MEASURING SYSTEM
Filed Oct. 19, 1964
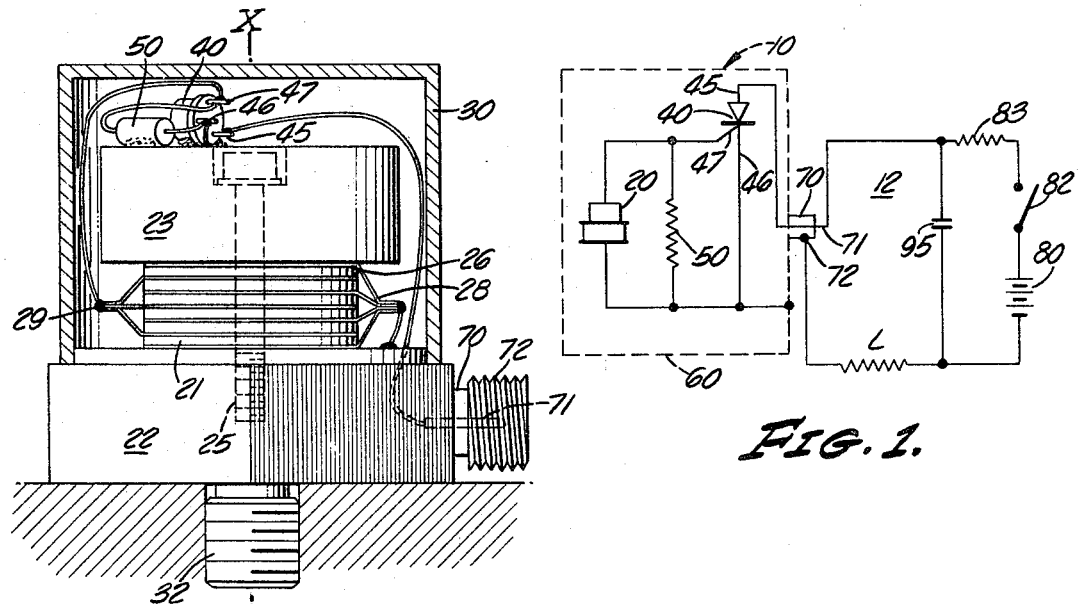
FIG. 1.
FIG. 2.
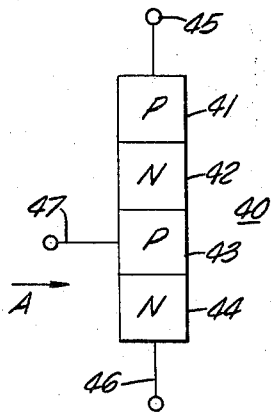
FIG. 3.
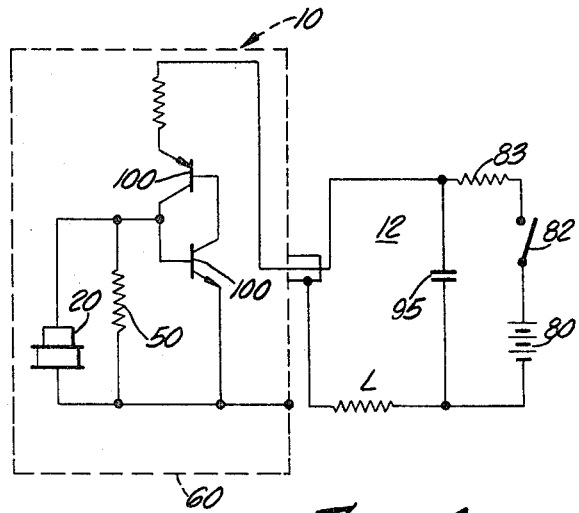
FIG. 4.
JOHN C. RIEDEL
INVENTOR
BY
ATTORNEY United States Patent Office 3,397,329
Patented Aug. 13, 1968

3,397,329
MEASURING SYSTEM
John C. Riedel, Pasadena, Calif., assignor to Endevco Corporation, Pasadena, Calif., a corporation of California
Filed Oct. 19, 1964, Ser. No. 404,608
14 Claims. (Cl. 310—8.4)

ABSTRACT OF THE DISCLOSURE

A safe-to-use motion detecting system is provided which employs a ceramic piezoelectric accelerometer and a solid-state switching device. Excessive motion is detected when the voltage generated by the piezoelectric accelerometer is developed at a rate above a predetermined rate and this voltage attains a value in excess of a predetermined level. A resistor is connected across a ceramic piezoelectric element to avoid misfiring from pyroelectric effects. The piezoelectric element and the solid-state switching device are mounted in thermally conductive relation to render the action of the motion detector independent of temperature and are mounted in a metal housing to preserve calibration and to avoid misfiring from electrostatic fields.

---

This invention relates to motion detecting systems and more particularly to an improved combination of accelerometer and switch for developing a control signal in response to accelerations exceeding a predetermined threshold for limiting motion such as shock or vibration to a desired amount or for producing some desired action when such a threshold is exceeded.

There are many circumstances under which it is desirable to protect a device from excessive motion such as shock or vibration in order to prevent excessive strains from developing in the device which might otherwise result in its fracture or destruction. For example, it is desirable to protect motor vehicles, pumps, fans, aircraft engines, vibration shakers, railroad trains, and the like, from vibrating more than some predetermined amount representing a safety level. Likewise, there are other circumstances under which it is desirable to produce an electric signal when a device is subjected to an impact exceeding a predetermined threshold. For example, it is desirable to employ an impact detector in the nose of a torpedo to detonate the torpedo if and only if the torpedo strikes an object which causes it to decelerate at a rate exceeding some predetermined amount. Also, it is desirable to provide impulse detectors, or other motion detectors, which can be employed for controlling flashbulbs used in photography and which may be employed in the application of triangulation methods for locating blasts that occur at the surface of the earth or otherwise.

In the past, vibration detectors have been employed which utilized an accelerometer mounted on an object undergoing test and a blocking oscillator excited by the accelerometer when the acceleration exceeds a predetermined threshold level to transmit a signal to a remote point where the oscillating signal has been detected and employed to produce a signal indicative of the fact that the acceleration theshold has been exceeded. Such systems are unsuitable for use when a lightweight, small, reliable unit is needed.

The object of the present invention is to provide an improved motion detection unit which includes a piezoelectric accelerometer and a solid-state switching device which, upon operation, will supply a large electric impulse which can be transmitted over a long cable, or otherwise, to a utilization unit. The motion detector of this invention is compact, of comparatively light weight, and has an acceleraion theshold which is substantially independent of its prior temperature history and which operates substantially independently of the frequency characteristics of the detected motion, over a wide frequency range.

More particularly, the motion detector of this invention utilizes a piezoelectric accelerometer and a solid-state switching device mounted within a common housing. A resistor is connected across the piezoelectric element to eliminate pyroelectric effects. The accelerometer employs a piezoelectric element composed of ceramic piezoelectric material to provide an accelerometer of high sensitivity. The switching device is connected to a connector in the wall of the housing for providing connections to an external circuit. The solid-state device is energized from an external source of electric power and is of a type which can be set in an open-circuit condition in which it remains indefinitely until triggered by a suitable signal from the accelerometer. The solid-state device also serves to isolate the accelerometer electrically from the external circuit while the solid-state device is in an open-circuit condition so that the response characteristics of the unit are relatively independent of the leakage resistances that develop across the external circuit.

The resistor that is connected across the piezoelectric element serves to drain off from the piezoelectric element any electric charges that may otherwise accumulate there slowly due to the pyroelectric properties of the piezoelectric material employed. The need for eliminating pyroelectric effects arises from the fact that it is desirable to employ polycrystalline ceramic materials that have high piezoelectric sensitivity and provide high electric capacitance. It will be understood that such piezoelectric elements are usually pyroelectric. As a result, the voltage developed across a piezoelectric element of an accelerometer depends not only on the acceleration to which the accelerometer is subjected, but may also depend on the prior temperature history of the accelerometer. As a rule, the temperature to which the accelerometer is subjected varies slowly, usually going through an entire temperature cycle over a period of a day or a large fraction thereof. On the other hand, the motions to be detected and against which protection is desired are either in the form of sharp impacts or vibrations that, typically, have frequency components of 50 Hz. (cycles per second) or more. By means of the resistor mentioned, voltages otherwise due to pyroelectric effects are eliminated so that the volage developed across the accelerometer depends upon the piezoelectric properties but not upon the pyroelectric properties of the element and the prior temperature history of the element. In spite of the fact that the detrimental effects of pyroelectric properties are greatly reduced, the sensitivity of the piezoelectric element itself nevertheless varies as a function of temperature possessed by the element at the time of operaion. In the best embodiment of the invenion, a piezoelectric element that has a negative temperature coefficient of sensitivity is employed in order to compensate at least partially for the fact that the firing voltage of a solid-state switching device normally decreases with temperature.

The invention, together with the other objects and advantages thereof, will be understood from the following description taken in connection with the accompanying drawing wherein:

FIGURE 1 is a schematic diagram of an acceleration detecting system employing this invention;

FIG. 2 is an elevational view partly in section of an accelerometer unit employing this invention;

FIG. 3 is a schematic diagram of a silicon controlled rectifier; and

FIG. 4 is a schematic diagram of an alternative embodiment of the invention.

In FIG. 1 there is shown a motion detector 10 that utilizes features of this invention. The detector 10 is connected to an external circuit 12 for supplying an impulse of electric energy to a load L when the detector 10 is subjected to a motion that changes by an amount that exceeds a predetermined threshold. The motion detector 10 may be employed to detect changes in motions in the form of accelerations, whether they be produced by impact or by vibration. The detector 10 includes a piezoelectric accelerometer 20 connected to energize a solid-state device in the form of a silicon controlled rectifier 40 and a resistor 50, all mounted within a housing 60. The detector includes a cable connector 70 for making electrical connections between the silicon controlled rectifier 40 and the external circuit 12.

As indicated in FIG. 3, and as is well known, the silicon controlled rectifier comprises a solid-state element having alternating P, N, P, N, zones 41, 42, 43, and 44 respectively. In this case, the external P zone 41 is connected to an anode terminal 45 while the external N zone is connected with a cathode terminal 46. The remaining P zone is provided with a gating electrode 47.

The anode terminal 45 and the cathode terminal 46 are connected respectively to the internal terminal 71 and the external terminal 72 of the connector 70. The two terminals 71 and 72 of the connector are electrically insulated from each other except for the connections made to the silicon controlled rectifier 40 and to the external circuit. The external circuit includes a source of electric power in the form of a battery 80 connected on one side through a resistor 83 and a mechanical switch 82 to the internal terminal 71 of the connector 70 and on the other side through the load L to the remaining terminal 72 of the connector. One terminal of a large capacitor 95 is connected to one terminal 71 of the connector 70 and the other terminal of the capacitor is connected through the load L to the other terminal 72. The capacitor 95 is employed to store an available supply of electrical energy. The capacitor 95 is charged relatively slowly through resistor 83 but is discharged rapidly when the silicon controlled rectifier 40 is triggered by a gating signal from the accelerometer 20.

The silicon controlled rectifier 40 normally serves as an open-circuit switch element that draws only a very minute electric current. When the voltage applied across the gate terminal 47 and the cathode 46 exceeds a predetermined threshold of about 0.5 volt, the silicon controlled rectifier is triggered, becoming conductive and acting as a short circuit. At this time, the effective resistance between the anode 45 and the cathode 46 changes from a very high value to a very low value. With a typical silicon controlled rectifier, 2N3030, the resistance changes from a high value much greater than 50 megohms to a resistance of low value, less than about 0.5 ohm. The transition from the open-switch condition to the closed-switch condition occurs very rapidly in a period measured in nanoseconds.

When the silicon controlled rectifier is thus activated, a block of electric energy previously stored on the capacitor 95 is quickly discharged through the load L. This load may have a resistance of only a few ohms, so that its temperature rises rapidly to a very high value. If the load L is part of a squib of a change of explosives, the charge is detonated. The load, however, may be in other forms and may, for example, be in the form of an electronic switch or mechanical relay which energizes or de-energizes a circuit as desired to connect or disconnect an auxiliary load from or to a source of electric power.

The motion detector of this invention is so designed that the silicon controlled rectifier is activated and hence, the load L in the external circuit is energized, when the object on which the motor detector 10 is mounted is subjected to a strong shock or other large acceleration.

As indicated in FIG. 2, the accelerometer 20 comprises a piezoelectric element in the form of a stack of circular piezoelectric crystals or discs 21 of the same size. The discs 21 are mounted coaxially between the base 22 and an inertia member 23. The piezoelectric discs are of annular configuration and are provided with electrodes that have been deposited on the opposite flat faces thereof. In the specific embodiment of the invention illustrated, six crystal discs are employed. Metal disc-shaped electrode elements 26 are mounted between successive discs and in firm contact with the electroded, or metallized, surfaces of the crystal discs. Seven such electrode elements are employed with the six crystals. The discs 21 and electrode elements 26 are supported firmly between the base 22 and the inertia member 23 by means of a post 24 attached to the base. In the present instance this post is in the form of a machine screw 24 that extends through the inertia member and through the discs into a threaded bore 25 in the base 22.

One set of alternate electrode elements provide one terminal 28 for the accelerometer and the other set of alternate electrode elements provides the other terminal 29 of the accelerometer. One of these terminals, the terminals 28, that includes four electrodes, is connected electrically to the base 22. The other terminal 29 that is connected to three of the electrode elements 26, is connected electrically to the gate electrode 47 of the silicon controlled rectifier 40. The rectifier 40 and the resistor 50 are cemented rigidly in place on the inertia member, partly to prevent them from vibrating loosely in the accelerometer and partly to maintain the rectifier in intimate heat exchange relation with the inertia member 23, which is composed of metal. This arrangement facilitates maintaining the piezoelectric element and the silicon controlled rectifier at the same temperature so that the temperature characteristic of one will tend to compensate for the temperature characteristics of the other.

A cover cap 30 encloses the accelerometer 20, the rectifier 40, and the resistor 50. The cap 30 is welded to the base 22, sealing them within the housing 60 where they are protected from exposure to dust, moisture, and fumes from external sources. A threaded stud 32 rigidly secured in the base 22 projects axially therefrom to facilitate mounting of the accelerometer on an object undergoing test.

The inertia member, the crystal unit 21, the base 22, and the stud 32 are arranged symmetrically along a common acceleration axis X—X.

The cable connector 70 projects radially from the base 22. The external conductor is in the form of a threaded fitting composed of metal mounted in electrically conductive contact with the metal base 22 and the metal cap 30. The internal terminal 71 is mounted coaxially within the threaded fitting 62 and is insulated therefrom, being electrically connected to the anode 45 of the silicon controlled rectifier 40.

When the object undergoing test is subjected to an acceleration along the axis X—X, a voltage is generated by the piezoelectric unit which is proportional to the acceleration so long as the frequency components of the acceleration are above a low frequency cutoff, but low compared with the resonant frequency of the accelerometer. The low frequency cutoff depends on the electrical capacitance of the piezoelectric element, the input resistance $R_g$ (see infra) of the silicon controlled rectifier at the firing point, and also on the resistance of the resistor 50. Such uniform response is attained, for example, where the object is subjected to a sudden impact along the X axis or while it is vibrated along the X axis at a frequency low compared with the resonant frequency of the accelerometer but above the cutoff frequency.

For convenience, the voltage that must be applied across the gate electrode 47 and the cathode terminal 46 to cause triggering is called the gate voltage $V_g$. The current that flows through the silicon controlled rectifier at the instant of triggering is called the gate current $I_g$. In effect, the resistance of the silicon controlled rectifier as viewed across the gate electrode 47 and the cathode 46 as indicated by the arrow A of FIG. 3 at the time the rectifier is triggered, is given by the relation $$R_g = \frac{V_g}{I_g}$$

The values of the gate voltage $V_g$, the gate current $I_g$, and the gate resistance $R_g$ are independent of the voltage supplied from the battery 80 over a very wide range. With the 2N3030 silicon controlled rectifier, the gate voltage is about 0.5 volt, the gate resistance is about 500,000 ohms at 25° C. The voltage applied across the anode and cathode terminals 45 and 46 may be of the order of 10 volts to 200 volts as desired without substantially changing the gate voltage or gate resistance.

The resistor 50 has a resistance which is high compared with the gate resistance of the silicon controlled rectifier 40 but low compared with the resistance of the silicon controlled rectifier when in open-circuit condition. The resistance of resistor 50 was about 22 megohms in the circuit described.

It can be shown that if the accelerometer is subjected to only a small acceleration, insufficient voltage is generated to trigger the silicon controlled rectifier 40. It can also be shown that if the rate at which the acceleration is attained is too low, the silicon controlled rectifier will not be triggered. The reason for this is that, if the acceleration changes too slowly, the charge developed on the piezoelectric element leaks off through the resistor 50 and through the silicon controlled rectifier too fast to permit the voltage to remain above the firing voltage of the silicon controlled rectifier. In practice, the voltage $V_i$ generated by the accelerometer is given by the equation:

$$V_i = aS$$

where $a$ = acceleration
$S$ = voltage output of the accelerometer per unit of acceleration The quantity $V_i$ represents the open-circuit voltage, that is, the voltage generated across the accelerometer with no load connected across it.

As is well known, the sensitivity $S$ depends upon characteristics of the piezoelectric material and the cross-sectional area and thickness of the piezoelectric discs and also on the characteristics of the mass member and the post 24 and also on the tension in the post.

In practice it is necessary for the charge generated by the piezoelectric crystals to be large enough so that, as the charge is drained off through the silicon controlled rectifier, the voltage supplied by the accelerometer will be sufficiently large to bring about complete triggering of the silicon controlled rectifier from its open-switch to its closed-switch condition. It can be shown that for an accelerometer having a capacitance C, triggering will occur only if the conditions expressed by the following two equations are met:

$$C = \frac{dV_i}{dt} > I_g$$

and $$V_i > V_g$$

It can be shown that when a sinusoidal AC voltage is suddenly applied to the input of the silicon controlled rectifier, the rectifier will be triggered during the application of the first lobe of the signal if the open-circuit voltage generated by the accelerometer, has an amplitude given by the following equation:

$$V_T = V_g \sqrt{1 + \frac{1}{(2\pi f R_g C)^2}}$$

The voltage $V_T$ is that value of the open-circuit voltage $V_i$ which must be developed by the accelerometer in order to trigger the silicon controlled rectifier. From this equation it will be noted that the trigger voltage $V_T$ is substantially independent of the frequency $f$ of the applied signal if the period of the signal is small compared with the time constant $R_g C$. In a particular case for which $R_g$ was 500,000 ohms and the capacitance C of the stack of crystals was 10,000 picofarads, the trigger threshold $V_T$ was independent of the frequency above about 20 c.p.s. In testing the acceleration detector, the unit was mounted on a shaking table driven at various predetermined frequencies and the amplitude of acceleration was increased continuously at each frequency. In this case, it was found experimentally that the acceleration required to trigger the silicon controlled rectifier was about 50G and varied less than 10% for frequencies over a range from 50 Hz. to 1000 Hz.

It has been found that the foregoing conditions can be satisfied over a wide frequency range by employing a silicon controlled rectifier of type 2N3030 and by employing an accelerometer having a capacitance of 10,000 pf. and an open-circuit sensitivity of 15 mv./G. At the same time, firing that might be caused by pyroelectric effects are avoided by virtue of the fact that ambient temperatures change very slowly and the resultant charges leak off through resistor 50 and the silicon controlled rectifier.

In practice, the gating voltage $V_g$ decreases as the temperature rises, falling from about 0.8 volts to about 0.4 volts as the temperature rises from −25° C. to +125° C. In order to partially compensate for the fall-off of gating voltage $V_g$ as the temperature rises, an accelerometer is employed which produces an open-circuit voltage which also diminishes with temperature. For this purpose, the crystals are composed of ceramic piezoelectric material such as a suitable composition of lead zirconate-titanate, which has a negative temperature coefficient of sensitivity.

While the invention has been described as employing a silicon controlled rectifier, it will be understood that the other types of solid-state switch elements having very high resistance in the open-switch condition and very low resistance in the closed-circuit condition may be employed. For example, as illustrated in FIG. 4, a pair of transistors 100 may be employed in place of a silicon controlled rectifier. However, this arrangement is not as desirable as one employing a silicon controlled rectifier because of the fact that a pair of transistors is more expensive than a single silicon controlled rectifier and may draw more current than a single silicon controlled rectifier in the open-switch condition. While a single transistor could be employed in place of a silicon controlled rectifier, such an arrangement is not as satisfactory as it is non-latching and therefore requires special biasing arrangements to maintain the transistor in its open-switch condition in the absence of a signal from the accelerometer. Other types of solid-state switching elements, such as unijunction transistors may also be used advantageously in other embodiments of the invention. Broadly, the term solid-state switching element refers to an element which comprises at least two types of semiconductive materials, one a p-type material and the other an n-type material and at least three electrodes, two in a voltage supply circuit and a third for use as a gating electrode to trigger a large change in resistance of the element between the first two electrodes.

The most satisfactory solid-state switching elements to employ in practice are those which are self-latching and have a high ratio of resistance in the open-switch condition to resistance in the closed-switch condition. By a self-latching switching element is meant one which remains in its new state after switching even though the triggering signal has been removed. In any event, in the best embodiment of the invention, the solid-state switch is of a type which is normally open but is latchable in a closed condition when actuated by voltage applied to the gating electrode if the voltage changes at sufficiently high rate and attains a predetermined threshold value. Of the solid-state switching elements now known, the most satisfactory for use in this invention is a silicon controlled rectifier.

It is thus seen that we have provided an acceleration limiting device which is compact, of low weight of relatively low cost, and of improved reliability over a wide range of frequencies, and a wide range of temperatures.

It is to be understood that the invention is not limited to the specific details of the embodiments described herein but may be embodied in many other forms within the scope of the appended claims.

The invention claimed is:

1. In a motion detecting device:
   an accelerometer adapted for mounting on an object undergoing acceleration, said accelerometer having means including a piezoelectric element responsive to the acceleration of such object whereby a voltage is developed by said element corresponding to the acceleration of said object,
   means comprising a solid-state switching device having a high resistance state and a stable low resistance state, and
   means connecting said piezoelectric element to said switching device and operative to change said switching element from one of said resistance states to the other only when a voltage is developed by said element at a rate above a predetermined rate and to a value in excess of a predetermined level.

2. In a motion detecting device as defined in claim 1 wherein said piezoelectric element is composed of a ceramic pyroelectric material, and a resistor is shunted across said piezoelectric element for draining off charges caused by changes in ambient temperature.

3. In a motion detecting device as defined in claim 2 wherein said switching device is a silicon controlled rectifier that has a base connected to said accelerometer and that has an effective resistance that is switched from a high resistance to a low resistance when the signal applied to said base reduces the effective resistance of said rectifier to a predetermined intermediate value known as the gating resistance, and wherein the resistance of said resistor is small compared with said high resistance but is large compared with said gating resistance.

4. In a motion detecting device:
   an accelerometer and a solid-state switching element mounted within a common metal housing, and means for attaching said housing securely on an object undergoing acceleration,
   said accelerometer having means including a piezoelectric element responsive to the acceleration of said object,
   said solid-state switching device being connected to said piezoelectric element and being operated only when a voltage is being developed by said element at a rate above a predetermined rate and said voltage has attained a value in excess of a predetermined level.

5. In a motion detecting device as defined in claim 4 comprising metallic means thermally connecting said solid-state switching element and said piezoelectric element.

6. In a motion detecting device:
   an accelerometer comprising a piezoelectric element secured to a base member and an inertia member mounted on said piezoelectric element in heat conductive relation with said inertia member and a solid-state switching element mounted on said inertia member in heat conductive relation with said inertia member,
   means for mounting said base on an object undergoing acceleration whereby a voltage corresponding to the acceleration is developed by said piezoelectric element,
   said solid-state switching device being connected to said piezoelectric element and bring controlled by a voltage from said piezoelectric element above a firing threshold, the firing threshold of said switching device varying as an inverse function of temperature, said accelerometer having a sensitivity to acceleration that also varies as an inverse function of temperature.

7. In a motion detecting device as defined in claim 6 wherein said piezoelectric element is composed of a ceramic pyroelectric material, said acceleration detecting device comprising a resistor shunted across said piezoelectric element for draining off charges caused by changes in ambient temperature.

8. In a motion detecting device as defined in claim 7 wherein said switching device is a silicon controlled rectifier that has a base connected to said accelerometer and that has an effective resistance that is switched from a high resistance to a low resistance when the signal applied to said base reduces the effective resistance of said rectifier to a predetermined intermediate value known as the gating resistance, and wherein the resistance of said resistor is small compared with said high resistance but is large compared with said gating resistance.

9. In a motion detecting device:
   an accelerometer, a resistor, a solid-state switching element mounted in a hermetically sealed housing and means for mounting said housing securely on an object undergoing acceleration,
   said accelerometer having means including a piezoelectric pyroelectric element responsive to the acceleration of said housing, said resistor being connected across said element for preventing voltages from developing across said element because of relatively slow changes in the temperature thereof, whereby a voltage is developed by said element that varies with the acceleration of said object.

10. In a motion detecting device:
    an accelerometer having an inertia member, a resistor, and a silicon controlled rectifier mounted within a hermetically sealed housing, said accelerometer comprising a piezoelectric pyroelectric element secured to the base of said housing,
    both said piezoelectric pyroelectric element and said silicon controlled rectifier being mounted in heat conductive relation with said inertia member,
    said rectifier having a high resistance in one state and a low resistance in another state and being characterized by a firing threshold voltage for switching from said one state to said second state,
    the firing threshold voltage of said silicon controlled rectifier and the sensitivity of said accelerometer both decreasing as the ambient temperature rises,
    and the resistance of said resistor being small compared with said high resistance but being large compared with the resistance of said silicon controlled rectifier during switching from the high resistance to the low resistance condition.

11. In a motion detecting device:
    an accelerometer and a solid-state switching element mounted within a housing having an external electrical connector,
    said solid-state element having a high resistance state and a low resistance state between two terminals thereof,
    means for applying a signal from said accelerometer to said solid-state switching device to switch said device from said high resistance state to said low resistance state,
    means for connecting said terminals to said connector whereby said solid-state element may be energized from an external source and may be employed to control an external load.

12. A motion detecting device as defined in claim 11 in which said solid-state device is a silicon controlled rectifier.

13. A motion detecting device as defined in claim 11 in which said housing is hermetically sealed.

14. In a motion detecting device:
an accelerometer adapted for mounting on an object undergoing acceleration,
said accelerometer having means including a piezoelectric element responsive to the acceleration of such object whereby a voltage is developed by said element corresponding to the acceleration of said object,
voltage detecting means comprising a solid-state switching device for producing a substantial electric current in a high-current state and substantially no electric current in a low-current state and being rapidly triggerable from said low-current state to said high-current state, and
means connecting said piezoelectric element to said voltage detecting means for triggering said solid-state switching device from said low-current state to said high-current state only when a voltage is generated by said piezoelectric element at a rate above a predetermined rate and to a value in excess of a predetermined level.

References Cited

UNITED STATES PATENTS

| | | | |
|---|---|---|---|
| 2,639,210 | 5/1953 | Robertson | 310—8 |
| 3,045,131 | 7/1962 | Orlacchio | 310—8 |
| 3,049,642 | 8/1962 | Quinn | 307—88 |
| 3,060,748 | 10/1962 | Schwartz | 310—8 |
| 3,130,329 | 4/1964 | Cother | 310—8 |
| 3,060,333 | 10/1962 | Bradley | 310—8 |
| 3,160,795 | 12/1964 | Aune | 307—88 |
| 2,691,159 | 10/1954 | Heibel | 310—8 |
| 3,181,071 | 4/1965 | Smith | 307—88 |
| 3,185,869 | 5/1965 | Shoor | 310—8 |
| 3,196,794 | 7/1965 | Meade | 102—70 |
| 3,210,560 | 10/1965 | Stehney | 307—88 |
| 3,218,525 | 11/1965 | Moore | 307—88 |
| 3,233,466 | 2/1966 | Shaw | 310—8 |

OTHER REFERENCES

Electronics, pp. 52 and 53, Aug. 31, 1962, by James K. Skilling.

J. D. MILLER, *Primary Examiner.*